No. 767,081. PATENTED AUG. 9, 1904.
S. H. PRAY.
SIGNATURE GATHERING MACHINE.
APPLICATION FILED FEB. 6, 1903.
NO MODEL. 8 SHEETS—SHEET 1.

Fig. 1

Witnesses:
Oscar F. Hill
Edith J. Anderson

Inventor:
Stuart H. Pray
by Macleod Calver
& Randall
Attorneys.

No. 767,081. PATENTED AUG. 9, 1904.
S. H. PRAY.
SIGNATURE GATHERING MACHINE.
APPLICATION FILED FEB. 6, 1903.
NO MODEL. 8 SHEETS—SHEET 7.

Witnesses:
Robert Wallace,
Oscar F. Hill

Inventor:
Stuart H. Pray
by Macleod Calvert & Randall
Attorneys.

No. 767,081. PATENTED AUG. 9, 1904.
S. H. PRAY.
SIGNATURE GATHERING MACHINE.
APPLICATION FILED FEB. 6, 1903.
NO MODEL. 8 SHEETS—SHEET 8.

Witnesses:
Oscar F. Hill
Edith J. Anderson.

Inventor:
Stuart H. Pray
by Macleod Calver & Randall
Attorneys.

No. 767,081.

Patented August 9, 1904.

UNITED STATES PATENT OFFICE.

STUART H. PRAY, OF NORWOOD, MASSACHUSETTS.

SIGNATURE-GATHERING MACHINE.

SPECIFICATION forming part of Letters Patent No. 767,081, dated August 9, 1904.

Application filed February 6, 1903. Serial No. 142,122. (No model.)

*To all whom it may concern:*

Be it known that I, STUART H. PRAY, a citizen of the United States, residing at Norwood, in the county of Norfolk, State of Massachusetts, have invented a certain new and useful Improvement in Signature-Gathering Machines, of which the following is a specification, reference being had therein to the accompanying drawings.

The invention has relation to machines of the class which are known as "signature-gatherers," and by means of which the series of signatures of a book are gathered or assembled automatically in proper order in readiness for being bound.

In a machine embodying my invention supplies of the different signatures to be gathered or assembled are placed, respectively, in stacks or piles or other arrangement in a series corresponding in number and order with the number and order of the signatures in the book to be constituted thereof. Devices are provided for taking a signature from each of the supplies of the series and for transferring such signatures to a collecting mechanism, the said collecting mechanism serving to receive the signatures as the same are withdrawn from the stacks or piles and to cause signatures from the respective stacks or piles to become assembled in proper order to constitute a book. By such collecting mechanism the signatures are progressively advanced relative to the series of stacks or piles in such manner that a signature from the first stack or pile has placed therewith one from the second stack or pile, a signature from the third stack or pile being next added thereto, and so on in regular succession until the end of the series of stacks or piles is reached and all the signatures of a book have been placed together, and the process being successively continued and repeated with the other signatures which are drawn from the first stack or pile, so that a number of books are being gathered or assembled at one and the same time. After passing the series of stacks or piles of signatures the completed assemblages of signatures are discharged from the collecting mechanism in order that they may be taken away for the purpose of being bound.

In the accompanying drawings I have illustrated an embodiment in preferred form of the various features of the invention, and I will now describe the invention with reference to the said drawings.

In the drawings, Figure 1 is a partial front elevation of a machine containing the preferred embodiment of the invention, only a portion of the length of the machine being represented. The parts are shown in the positions which they occupy after the pickers have been moved from right to left into place below the stacks or piles of signatures with which the respective pickers coöperate in readiness to be caused to engage with the bottom signatures of the said stacks or piles. Fig. 6, Sheet 5, shows in side elevation one of the pickers detached. Fig. 7, Sheet 5, is a side elevation of the body portion or arm of the picker. Fig. 8, Sheet 5, is an end elevation of the said body portion or arm of the picker. Fig. 9, Sheet 5, is a view in vertical section on the plane indicated by the dotted line 9 9 in Fig. 7. Fig. 10, Sheet 5, shows in plan the working end of the body portion or arm of the picker. Figs. 11 and 12, Sheet 5, show in side elevation and plan, respectively, the screw with enlarged head for securing the cup of the picker to the body portion or arm. Figs. 13 and 14, Sheet 5, show in side elevation and plan, respectively, the cup of the picker. Fig. 27, Sheet 5, is a plan, Fig. 28 an end elevation, and Fig. 29 a side elevation, of the detacher by means of which a signature is disengaged from the picker which has depressed the head portion of the signature.

The framework in general of the machine is designated 1. The main shaft of the machine is marked 100. It is furnished at one extremity thereof with a gear 101, Figs. 1 and 2, with which meshes a pinion 102, fast upon a driving-shaft 103. The said driving-shaft may be furnished in practice with any preferred power connections and any approved means for shipping the driving power on and off. I have shown said driving-shaft furnished with fast and loose band-pulleys 104 105 for the reception of a suitable driving-band by means of which driving-power may be transmitted to the machine. At 106 is a shipper-fork for the said band, it being mounted upon the rear end of a rock-shaft 1061, Fig. 1, the latter carrying at its front end an upwardly-extending arm 1062. The said arm 1062 is connected by a rod 1063 to a longitudinally-movable shipper-slide 1064, the latter having connected therewith one extremity of a spring 1065, having the other extremity thereof connected with a suitable fixed portion of the machine, the said spring tending to move the shipper-slide and shipper-fork in a direction to place the driving-band on the loose pulley 105, and thereby unship the machine.

Figure 1:
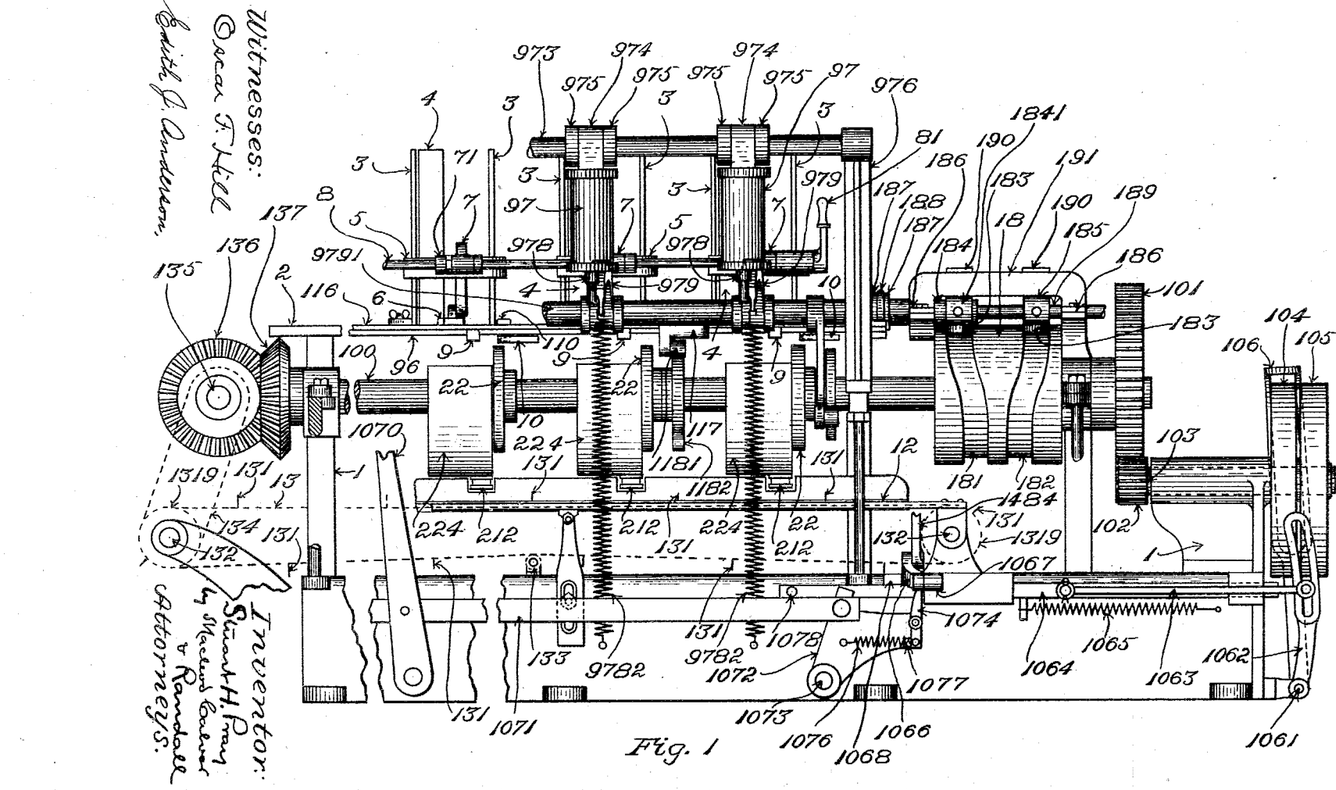

At 1066 is a pivoted latch hung upon a fixed support 1067 and engaging with a projection 1068 on the shipper-slide to hold the shipper-slide and shipper-fork in position to retain the band on the fast pulley 104. For convenience in throwing the driving power on and off by hand a shipper handle or lever 1070 is provided, it being connected, as by means of a rod or bar 1071, with an arm 1072, which latter is pivoted at 1073 upon the machine-framing. Upon the arm 1072 is pivoted a trip 1074, the said trip having connected therewith one extremity of a spring 1076, having its other extremity connected with the arm 1072, the said spring tending to hold the tail of the trip pressed in contact with a stop-pin 1077, with which the arm 1072 is provided. When the arm 1072 is swung toward the left, as by movement transmitted to the same through the bar 1071, the trip 1074 engages with the latch 1066 and raises it. By this action the trip may be disengaged, if desired, for the purpose of releasing the shipper-slide 1064 to the action of its spring 1065 and enabling the shipper-fork to be swung so as to transfer the driving-band from the fast pulley 104 to the loose pulley 105. Continued movement of the arm 1072 toward the left will cause it to engage with a projection 1078 on the shipper-slide, so as to move the said shipper-slide in the reverse direction to the movement occasioned by the spring 1065 and operate the shipper-fork to return the driving-band to the fast pulley 104. In the return of the arm 1072 to the normal position of the same, which is shown in Fig. 1, after the said arm 1072 has been moved in the manner last referred to, so as to ship the driving power on, the trip 1074 turns upon its pivot when it encounters the latch 1066, and thus it is enabled to pass the said latch, the spring 1076 acting to return the trip into contact with the stop-pin 1077 as soon as the trip has passed below the latch.

The machine is provided with means for supporting conveniently supplies of the various signatures which are to be assembled or gathered. I usually arrange the said supplies in vertical stacks or piles in which the signatures lie horizontally one upon another, although in some cases they may be otherwise arranged, and I provide suitable holders for the said stacks or piles. Any desired form of hopper or other receptacle may be used in practice. In the present instance the machine is furnished with an elevated shelf 2, Figs. 1, 2, and 3, upon which latter the stacks or piles of signatures are placed, the said shelf having in connection therewith sets of uprights, as 3 3 and 4, to partially inclose and retain in place the respective stacks or piles. Thus for each stack or pile opposite uprights 3 3, forming side pieces, are provided, and one upright, 4, forming a front piece, these three uprights partially inclosing the stack or pile. The side uprights 3 3 are suitably attached to the shelf 2, as by bolts or screws, while, as shown best in Figs. 2 and 3, the front upright 4 is carried by a right-angled bracket 5, having one arm thereof attached to one of the side uprights 3 and having its other arm extended parallel with the front edge of the shelf 2, the said arm supporting the said upright 4 at a short distance from the said front edge of the shelf. The said distance is such as to leave the front portion of the stack or pile unsupported and to enable the bottom signature in the stack or pile to be depressed at the front of the shelf by means of the devices which hereinafter are described, and to permit such signature to be withdrawn from beneath the stack or pile in being transferred from the stack or pile to the collecting mechanism. A suitable follower or presser is employed in connection with each stack or pile for the purpose of insuring proper presentation of the signatures to the devices by means of which they are successfully acted upon and withdrawn from the stack or pile. In the present case I employ in connection with each hopper or receptacle (see more particularly Figs. 2 and 3) a presser 6 in the shape of a flat bar that is adapted to rest upon the top of the stack or pile in such hopper or receptacle, it being pivoted at its rear end to the free extremity of an arm 7, which is loosely hung upon a rod 8, extending along the machine at the front of the shelf 2 and slightly above the same. The loose hanging of the respective arms permits the pressers acting in connection with the respective stacks or piles to accommodate themselves independently to the heights of the latter, and the pivotal connection of the presser-bar to the arm enables the presser to lie flatwise upon the top signature of the stack or pile in connection with which it is used.

By way of affording a clear preliminary understanding of the general character of the essential working parts of my machine I first will refer briefly to such parts and their main functions. In connection with each stack or pile of signatures I provide a picker by means of which to separate the forward portion of the leading element of the said stack or pile from the succeeding elements thereof. In the present case the leading element of the stack or pile is the bottom or underlying signature in such stack or pile, and the picker is employed to depress the forward portion of the said bottom signature in front of the forward edge of the shelf 2 and away from the signature next above. Various kinds and constructions of devices suitable for the purpose have been proposed heretofore for use in this and similar connections, and I do not necessarily limit myself in the case of the broader embodiments of the different features of the invention with respect to the particular kind or construction of picker which is used or to the precise mode of operation thereof. Preferably, however, I employ a suction or vacuum-picker, and have shown such a picker at 9 in the accompanying drawings. The forward portion of the leading signature of a stack or pile having been separated from the next succeeding signature by the action of the picker it may then, in some of the simpler embodiments of certain features of my invention, be engaged at once by the transferring mechanism and withdrawn and delivered to the collecting mechanism. Preferably, however, I provide in connection with the picker a separator, as at 10, which is caused to enter between the signature which has been engaged and partly separated by the picker and the next succeding signature, and either simply maintain the separation after the disengagement of the picker from the leading signature or in addition more completely effect such separation in order to permit of the engagement of the separated edge of such signature by the transferring devices by means of which the signature is withdrawn from the stack or pile and delivered to the collecting mechanism. The precise construction, &c., of the separator is not necessarily material to some of the embodiments of the broader features of the invention, although in the accompanying drawings I have shown separating devices embodying improvements which in themselves constitute important portions of the invention in its more complete and preferred embodiment. The devices for withdrawing the leading signature from the stack or pile and transferring the same to the collecting mechanism may be variously constituted and constructed in some cases. Various constructions and arrangements suitable for the purpose have heretofore been proposed for the use in similar connections, and I do not necessarily limit myself in the case of some of the embodiments of the different features of the invention with respect to the particular kind or construction of transferring devices which is used. Preferably, however, I employ moving grippers and preferably, also, I employ grippers moving in a circular path, as I presently will proceed to explain.

The collecting mechanism is not in itself of the gist of the invention and may be of any approved type or character. I have herein shown the same as comprising a table-like support, as at 12, and endless conveyer-chains, as 13 13, moving throughout the upper portion of their course within longitudinal depressions of the said table, as at 121 121, and provided with projections, as 131 131, which engage with the signatures laid by the transferring devices upon the upper surface of the said table. The said conveyer-chains move the signatures lengthwise of the said table, the movement of the said chains being so timed as that each signature which is laid by the transferring devices upon the table 12 at the beginning of the series of stacks or piles of signatures shall be presented opposite the transferring devices of the succeeding stacks or piles in turn in season to receive therefrom one signature from each stack or pile in order until the book has been completely assembled.

Having now indicated the general character and main features of the essential working parts of my machine, I will proceed to describe the mechanism more in detail.

The picker 9 is shown in its working relations in Figs. 1 to 5. I have devised an improved and novel construction thereof which I prefer to employ, but which, however, is not claimed herein, it constituting a separate invention. This construction is shown in detail in Figs. 6 to 14, Sheet 5, of the drawings. It comprises, essentially, a body portion or arm 91, having an air-passage 92, which extends longitudinally through the same. This air-passage opens upwardly at the free extremity of the said body portion or arm, as indicated in Figs. 6, 7, 8, and 10. At this extremity the body portion or arm 91 is tapped or threaded interiorly and is formed with a tubular boss 93, surrounding the end of the air-passage. The end of this tubular boss 93 constitutes a raised seat for a cup 94, Figs. 6, 13, and 14, of suitable flexible and elastic material—such, for instance, as rubber. The said cup has a bottom or base, as 941, with central hole 942 and a raised narrow flange, as 943. The under surface of the bottom or base 941 rests against the outer end of the boss 93, and within the hollow of the cup is received the enlarged flat head of a tubular screw 95, the stem of which passes through the central hole 942 in the bottom or base of the cup and is screwed into the threaded portion of the air-passage of the body or arm 91 of the picker. The enlarged head of the screw 95 by partially filling the interior space of the cup, and thus reducing the depth of such space, prevents the bottom sheet of the signature which is engaged by the picker from being forced by atmospheric pressure in the form of a deep saucer-like depression into the cup, which depression would form wrinkles in the paper and which wrinkles would permit the entrance of air, thereby destroying the hold of the picker upon the paper. The difficulty which I have hereby sought to obviate is more noticeable with thin paper. The edge of the lip or flange 943 of the cup projects above the upper level of the head of the screw 95. The base or bottom of the cup is larger in diameter than the tubular boss 93 of the arm or body 91 of the picker, and consequently projects radially beyond the boss all around the latter, and the flexibility of the base or bottom of the cup is sufficient to enable the cup to conform itself to the surface of the paper against which its edge is pressed. The head or top of the screw 95 is formed with a number of grooves 951 951, radiating in different directions from the central opening through the screw. These grooves obviate possibility of such close adherence of the signature to the said head or top as would operate to prevent subsequently the ready disengagement of the signature therefrom. They constitute channels through which in separating the picker from the signature air is permitted to flow radially, thereby destroying the suction. They also enable a substantially uniform suction to be produced throughout all portions of the area of the cup. They prevent the paper from adhering to the central portion of the head of the screw immediately at and around the passage through the screw and permit the air to be exhausted from within the outer portions of the cup as well as enable the exhaustion to continue notwithstanding leakage around the edge of the cup.

Figures 2, 40, 41, 42, 43:
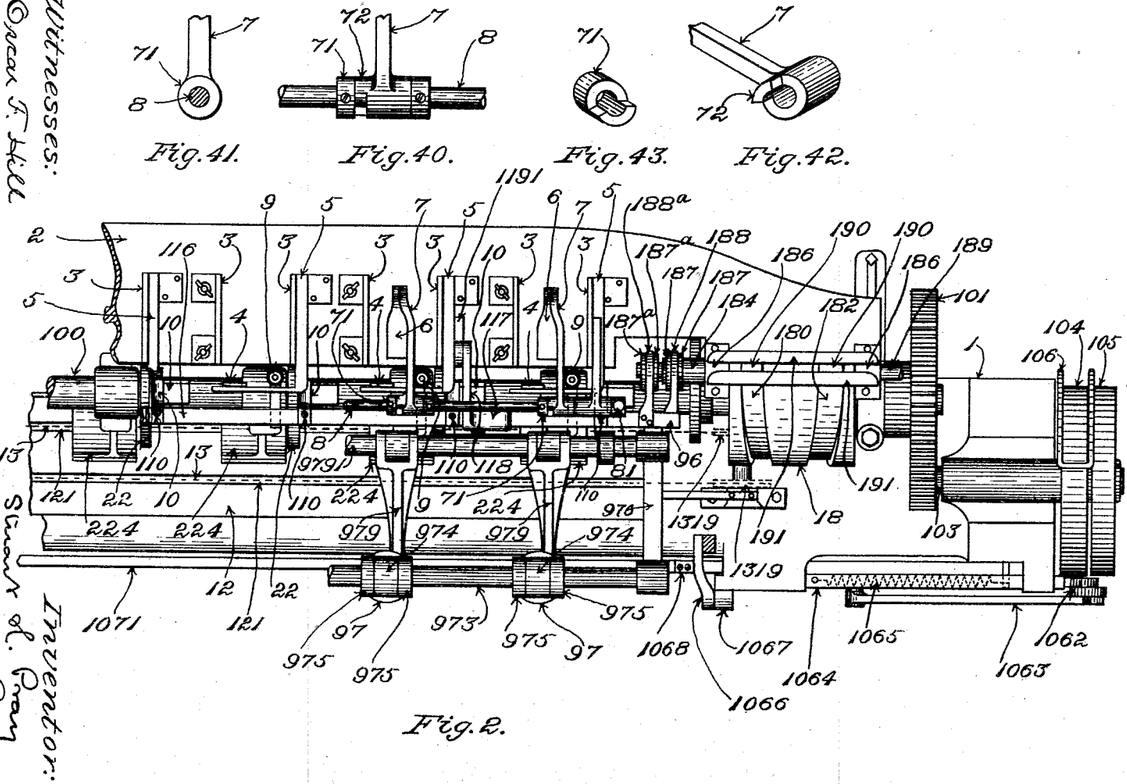
Fig. 2 is a partial plan view of the machine with the parts in the same positions as in Fig. 1, certain of the details being omitted for the sake of clearness.
Fig. 40, Sheet 2, is a detail view, in front elevation, showing portion of a presser-supporting arm and its connection with the rod on which it is mounted.
Fig. 41, Sheet 2, is a view of the parts shown in Fig. 40 looking from the left-hand side in the latter figure.
Fig. 42, Sheet 2, is an isometric of a portion of a presser-supporting arm, showing the hub thereof.
Fig. 43, Sheet 2, is an isometric of a stop-collar for a presser-supporting arm.
Figure 3:
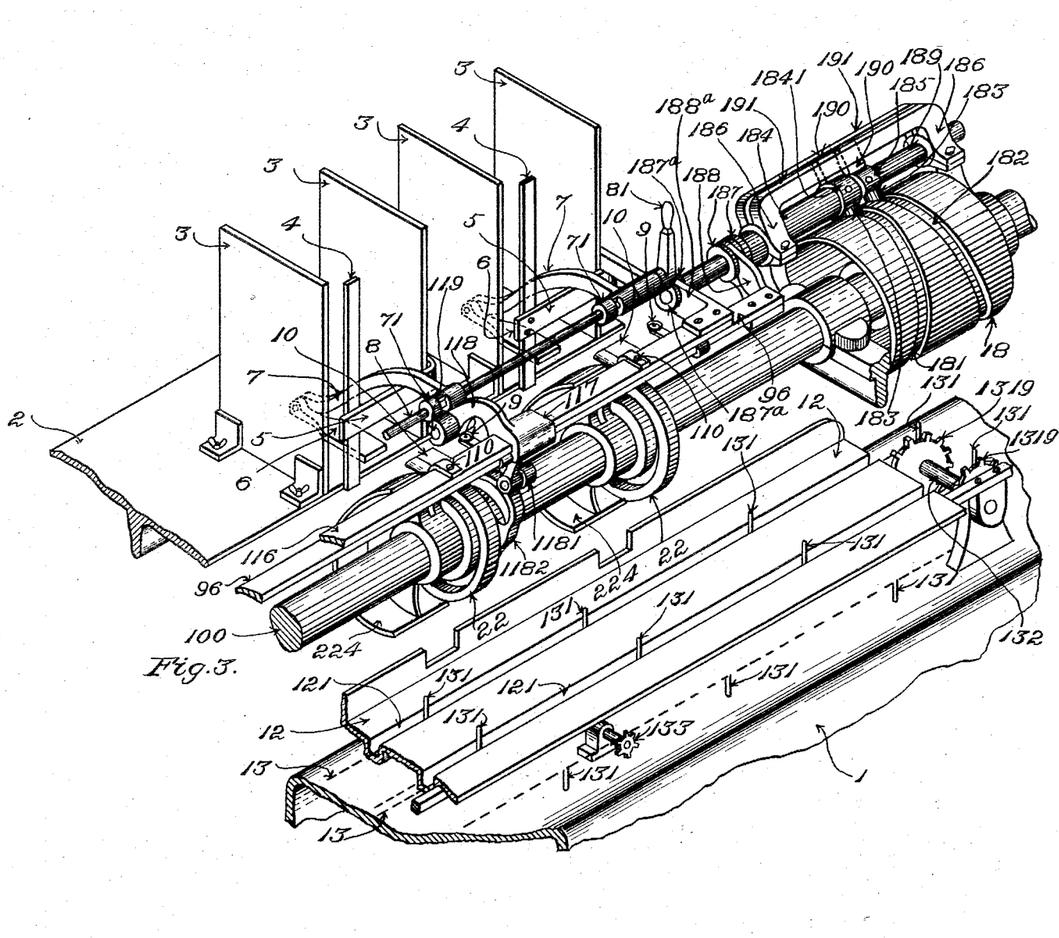
Fig. 3, Sheet 3, is an isometric view of a portion of the machine adjacent one end thereof, it showing chiefly the receptacles for two stacks of signatures, the pickers, separators, and transferrer-heads coöperating therewith, together with the operating connections for such working parts, portion of the bed upon which the signatures are delivered by the grippers, and portions of the collecting-chains. In this figure the parts are shown in the positions which they occupy after the separators have been moved from right to left into place at the front of the respective stacks or piles of signatures and the pickers have been returned to their normal positions by movement from left to right.
Figures 4, 5:
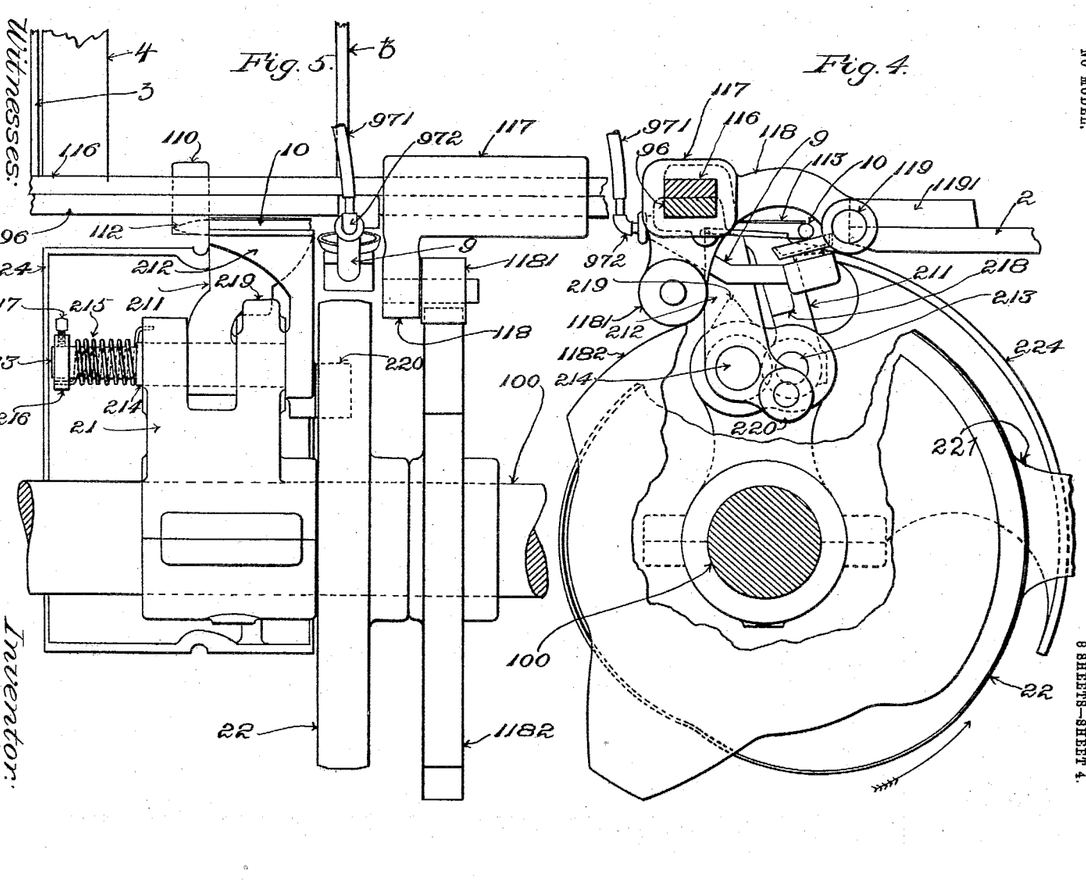
Fig. 4, Sheet 4, is a detail view, partly in section, on a plane at right angles with the main shaft of the machine, showing chiefly a picker, a separator, a transferrer-head, and their more immediate connections, the cams which are shown in this view being represented as partly broken away in order to show features which would otherwise be hidden.
Fig. 5, Sheet 4, is a view showing in front elevation the parts which are represented in Fig. 4, and in addition showing portions of the side uprights 3 3, between which a stack or pile of signatures is placed in practice, together with portion of the adjacent front upright 4.
Figures 15, 16, 17, 18, 19, 20, 21, 22, 23:
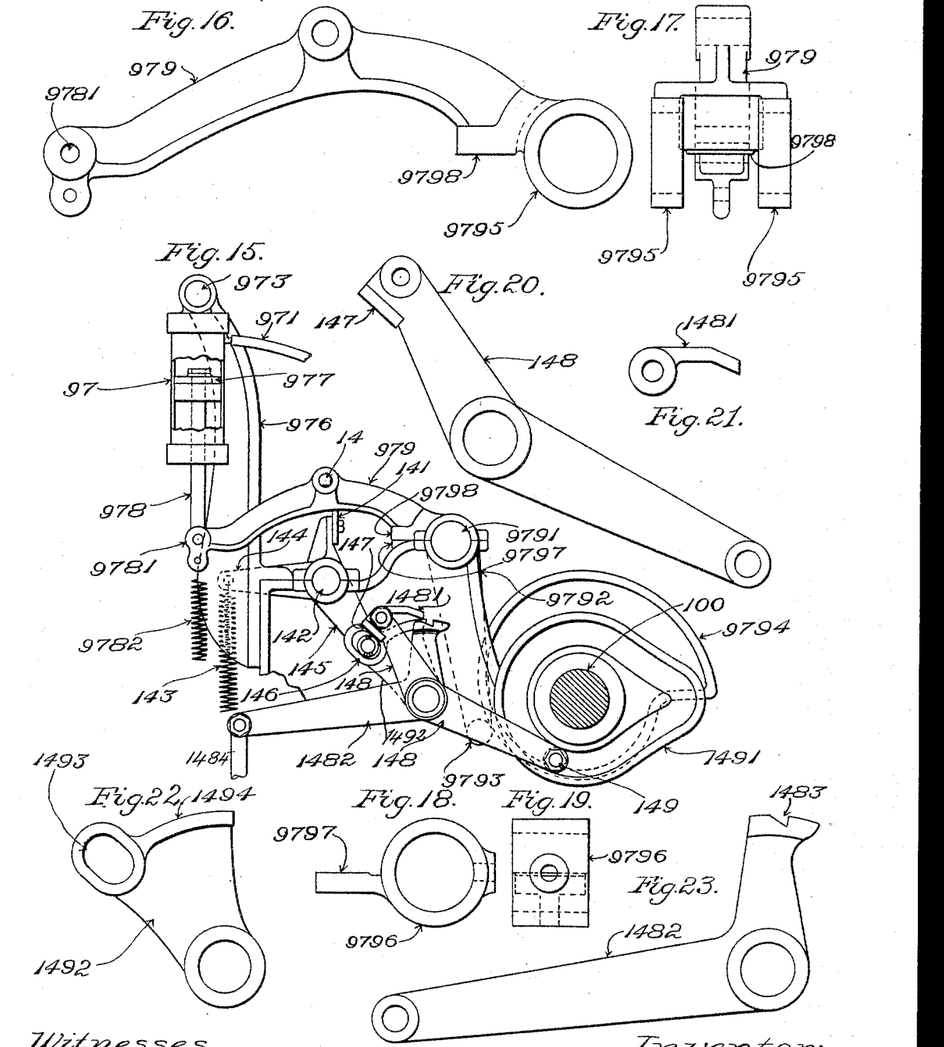
Fig. 15, Sheet 6, is a view in elevation showing more particularly the pump-operating mechanism, detector devices, and knock-off devices.
Fig. 16, Sheet 6, shows one of the pump-actuating arms in side elevation.
Fig. 17, Sheet 6, shows the said arm in end elevation.
Figs. 18 and 19, Sheet 6, show in side elevation and rear elevation, respectively, one of the collars which are mounted on the pump-actuating rock-shaft for engagement with the pump-actuating arms.
Fig. 20, Sheet 6, shows in elevation, detached, the main operating-lever of the detector and knock-off devices.
Fig. 21, Sheet 6, shows detached the dog carried by the lever of Fig. 20.
Fig. 22, Sheet 6, shows in elevation, detached, the shield which coöperates with the dog of Fig. 21.
Fig. 23, Sheet 6, shows detached the knock-off lever which is actuated by means of the dog of Fig. 21.

The picker 9 is mounted upon a bar 96, Figs. 1 to 5. The said bar extends lengthwise of the supporting arrangements for the series of stacks or piles of signatures and constitutes a common carrier for the series of pickers. To the said bar are communicated the movements by which the required action of the pickers is secured. The instrumentalities for communicating the proper movements to the bar 96 will presently be described. The said movements comprise, in brief, endwise movements of the bar 96, whereby the lateral movements of the respective pickers are occasioned and vertical movements whereby the lifting and depressing of the pickers are occasioned. The suction-producing connections of the pickers comprise in the present instance a suction-pump for each picker, although in some embodiments of the invention the relative number of suction-pumps is not material. I have shown a series of suction-pumps, as 97 97, &c., Figs. 1 and 2, Sheet 1, and Fig. 15, Sheet 6, arranged at the front of the machine. Lengths of flexible tubing 971 971, &c., Figs. 4, 5, and 15, are connected with the cylinders of the said suction-pumps, and elbow connections 972 972, Figs. 4 and 5, screwed into the air-passages of the pickers, have the corresponding ends of the lengths of flexible tubing applied thereto. The cylinders of the suction-pumps hang from a rod 973, Figs. 1, 2, and 15, extending lengthwise of the machine, the upper heads of the said cylinders being furnished with eyes or bearings 974 974, which respectively are fitted upon the said rod between collars 975 975 on the rod. The rod itself is mounted on brackets 976, attached to the main frame of the machine. The described mode of mounting the suction-pumps enables the cylinders thereof to swing in conformity with the swinging movements of the pistons 977 and piston-rods 978, Fig. 15, which are due to the curvilinear movements of the free extremities of the pump-actuating arms 979 979. The pump-actuating arms 979 979 are mounted upon a rock-shaft 9791. (See more particularly Fig. 15.) The latter is provided with an arm 9792, fast thereon and carrying a pin or roll at 9793, engaging with the periphery of a cam, as 9794, Fig. 15, upon the main shaft 100 of the machine. Cam 9794 has a gradual rise extending around a considerable portion of its periphery and a sudden drop. The respective pump-actuating arms 979 979 are fitted to the said rock-shaft 9791 with capacity for a certain amount of independent movement thereon. Each of the said arms is formed at its inner end with two eyes 9795 9795, Figs. 16 and 17, Sheet 6, fitting the said rock-shaft 9791. Upon the rock-shaft there is mounted and pinned fast thereto a hub, as 9796, which is shown separately in Figs. 18 and 19, Sheet 6, the said hub occupying the space between the eyes of the corresponding pump-actuating arm 979 and having a toe or projection 9797 to take under a shoulder 9798 on the arm. As the grade of the cam 9794 acts to turn the rock-shaft 9791 the projections or toes 9797 engage with the shoulders 9798 of the pump-actuating arms 979 979 and operate the latter positively to move the pistons inwardly within the pump-cylinders. As soon as pin or roll 9793 passes the high grade of the cam 9794 the rock-shaft is free to be turned in the reverse direction. The ensuing outward movement of the pistons for the production of a partial vacuum within the pump-cylinders is not produced by positive action, but is produced by the action of a yielding force, by means of which the respective pumps are operated independently with reference to one another. In the present instance the actuation of the respective pumps in a yielding manner and independently of one another is effected by means of spiral springs 9782 9782, Figs. 1 and 15, which are in connection with the respective pump-actuating arms 979 979. It is for the purpose of permitting independent yielding action of the respective pumps in exhausting that the said pump-actuating arms 979 979 are mounted loosely upon the rock-shaft 9791 and operated positively from the said rock-shaft to occasion only the inward movement of the pump-pistons. By providing connections acting to operate the pumps independently with yielding force in exhausting the respective pumps are left free to work faster or slower according as their pistons may tend to move more or less rapidly.

For the purpose of arresting the working of the machine in case the picker fails to draw down a signature detector and stop-motion mechanism usually will be employed in practice. I have shown in Fig. 15, Sheet 6, a form of such mechanism which I have devised, it not being claimed herein, inasmuch as it constitutes a separate invention. The said form of mechanism is intended to be combined with the suction arrangements to act in case a signature fails to adhere to one of the pickers. In Fig. 15 I have shown the said mechanism in connection with simply the pump-actuating arm 979 at the driving end of the machine; but from the said showing the relations of such mechanism to the remaining pump-actuating arms will be obvious. The details of the mechanism have been omitted from Figs. 1, 2, and 3 for the sake of clearness. In Fig. 15 the pump-actuating arm 979 carries a detent 14, in the shape of a pin, which projects laterally from the side of the said arm. In convenient proximity to each pump-actuating arm 979 is arranged a feeler 141, mounted on a rock-shaft 142. The said feeler is arranged to vibrate in a path which will intersect the said pin in the lowest position of the pump-actuating arm, such position corresponding with the outermost position of the piston. The rock-shaft 142 is turned in the direction to cause its feelers to feel for the detent-pin of the pump-actuating arms by means of a spring 143, that is connected at one end thereof with an arm 144, which is fast on the rock-shaft, the other end of the said spring being connected with some fixed point in the lower part of the machine. The rock-shaft is turned in the opposite direction positively by means of an arm 145, also fast on the said shaft and provided with a pin or roll at 146, which is engaged by the surface 147 on a lever 148, (shown separately in Fig. 20, Sheet 6,) the latter carrying at 149, Fig. 15, a pin or roll working in the groove of a cam 1491 on the main shaft 100. By means of the cam-operated lever and spring the feeler rock-shaft 142 is oscillated. It is moved by the cam 1491 to retract the feelers after the pump-actuating arms have been raised by their actuating means and just prior to the release of the said arms. After the release of the pump-actuating arms by their raising devices the feeler rock-shaft is freed to the influence of its actuating-spring 143, which latter then operates the rock-shaft to advance the feelers 141 to feel for the detent-pins 14, that are carried by the pump-actuating arms. In the case of those pickers which are properly engaged with the signatures the adhesion of the signatures to the pickers will block the entrances to the latter, and thereby flow of air through the cups into the corresponding pumps will be prevented or very much retarded. This will retard the descent of the pistons of the pumps, and correspondingly the movement of the pump-actuating arms, permitting the feelers 141 to pass beyond the detent-pins before the latter have been lowered into the path of movement of the feelers. Should, however, one of the pickers have failed to take hold of a signature, air will be permitted to flow freely through such picker into the corresponding pump, and the movable member of the latter will be permitted to descend freely and promptly, so that the detent-pin on the corresponding pump-actuating arm will pass down in front of the corresponding feeler and by its engagement with the latter will arrest the movement of the rock-shaft under the action of the spring 143. The knock-off devices employed in connection with the feeler devices may vary in practice more or less, but preferably comprise a dog, as 1481, Figs. 15 and 21, Sheet 6, which is pivoted to the lever 148. For coaction with the dog 1481 I employ a lever 1482, Figs. 15 and 23, Sheet 6, having a tooth, as 1483, to be engaged by the said dog 1481, the said lever 1482 having connected to its forwardly-extending arm the upper end of rod 1484, the lower end of which is joined to the latch 1066, Figs. 1 and 2, of the shipper mechanism. When the dog 1481 is permitted to engage with the tooth of the lever 1482, so as to move the said lever, the latter through its connection with the latch 1066 disengages the latch from the projection 1068 on the shipper-slide 1064, leaving the latter free to be solicited by its spring 1065 in a direction to move the shipper-fork 106, so as to unship the driving-power by shifting the driving-band from the fast pulley 104 to the loose pulley 105. For the purpose of controlling the engagement of the said dog 1481 with the said lever 1482 I provide a movable shield 1492, (shown best in Figs. 15 and 22, Sheet 6,) this shield being hung upon the same stud with levers 148 and 1482. It has a radial slot 1493, in which is received the pin or stud 146 of the arm 145 on the feeler rock-shaft 142, the said pin-and-slot connection causing the feeler rock-shaft and shield to move in unison. The shield 1492 has a curved edge 1494. Whenever the feeler rock-shaft and feelers are permitted to complete their forward movement under the influence of spring 143, the curved edge of the shield is carried in under the dog 1481, so as to lift such dog above the tooth of lever 1482. The advance of the dog then occurs without causing movement of said lever. Should, however, the forward movement of the feelers and feeler rock-shaft be arrested by engagement of a feeler with the detent-pin of one of the pump-actuating arms, then the shield will be detained in a position in advance of the tooth of lever 1482, and the dog 1481 in its ensuing movement will engage said tooth and operate the lever to occasion the unshipping of the driving-power of the machine.

Figures 24, 25:
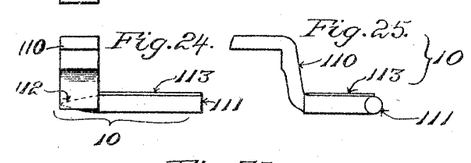
Fig. 24, Sheet 7, shows in elevation one of the separators detached.
Fig. 25, Sheet 7, is a side elevation of one of the separators.
Figure 26:
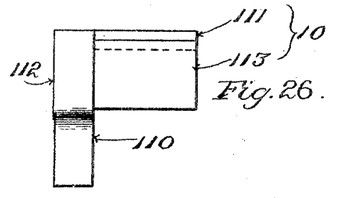
Fig. 26, Sheet 7, shows one of the separators detached in plan.

The separator 10 is shown in its working relations in Figs. 1 to 5 and separately in detail in Figs. 24, 25, and 26, Sheet 7. In plan it is essentially L-shaped, and it comprises, essentially, a wedge-shaped portion 112, constituting the entering end of the separator, a bent arm 110, extending forward from the said portion and by means of which the separator is attached to the carrier-bar, an extension 111, projecting laterally from said wedge-shaped portion at right angles to the latter, and a thin plate 113, which is applied to the said laterally-projecting extension. The wedge shape of the entering end of the separator facilitates the introduction of such end between the signature which has been engaged and partly drawn down by the picker and the signature next above the same. The thin plate 113 affords a broader support to the signature which is above the same. The separator 10 is mounted upon a bar 116, Figs. 1 to 5. The said bar extends lengthwise of the supporting arrangements for the series of stacks or piles of signatures and constitutes a common carrier for the series of separators. To the said bar are communicated the movements by which the required action of the separators is secured. The instrumentalities for communicating the proper movements to the bar 116 will presently be described. The said movements comprise, in brief, endwise movements of the bar 116, whereby the lateral movements of the respective separators are occasioned, and vertical movements whereby the lifting and depressing of the separators are occasioned.

The picker-bar 96 and separator-bar 116 are applied to guides which are provided, as at 117, in arms 118. A suitable number of the arms 118 is provided in the direction of the length of the machine to support the picker-bar and separator-bar and prevent the same from springing. The arms 118 118 are pivoted, as 119 119, Figs. 2, 3, and 4, to brackets 1191 1191, upon the shelf 2, the pivots 119 119 of the arms being located at the forward edge of the said shelf, so as to cause the pickers and separators in their vertical swinging movements to move concentrically with such edge. Antifriction-rolls 1181 1181, mounted upon the said arms 118 118, rest upon the peripheries of cams 1182 1182 upon the main shaft 100. By the action of the said cams as the main shaft is rotated the arms 118 118 are swung so as to communicate the necessary vertical movements to the picker-bar and separator-bar. The picker-bar and separator-bar are adapted to move endwise within the guides 117 117 of the vertically-swinging arms 118 118. For the purpose of communicating to the picker-bar and separator-bar the necessary endwise movements I employ the cam 18, which is mounted upon the main shaft 100. The said cam has cam-grooves 181 and 182, receiving cam-rolls 183 183, which respectively are mounted upon studs projecting from the collars 1841 and 185. The collar 1841 is fast upon a sleeve 184, which latter is fitted to a bearing at 186, suitably supported on the machine-framing. At its inner end the said sleeve is formed with collars 187 187, receiving in the space between them a lug 188, projecting from the picker-bar 96. These collars 187 187, coöperating with the lug 188, transmit to the picker-bar the endwise movement which is communicated to the sleeve 184 by the action of the cam-groove 181, while leaving the picker-bar free to be swung vertically in an arc concentric with the said sleeve. Within the sleeve 184 is fitted the cylindrical slide-bar 189, it being supported at its outer end in another bearing 186. The said slide-bar has the collar 185 aforesaid attached thereto and also is provided at its inner end with collars 187ª 187ª, receiving between them the lug 188ª, which is attached to the separator-bar 116. These lugs transmit to the separator-bar the endwise movement which is communicated to the slide-bar 189 by the action of the cam-groove 182 upon the roll 183, that is carried by the said slide-bar 189, while leaving the said separator-bar free to swing in a vertical arc in unison with the picker-bar. To prevent rotation of the sleeve 184 and slide-bar 189 under the action of the respective cam-grooves, the said collars 1841 and 185 are furnished with flat projections 190 190, working between the parallel guide-surfaces 191 191, which are connected with the bearings 186 186. The axes of the sleeve 184 and slide-bar 189 are in line with the axes of the pivots 119 119 of the arms 118 118, by which the picker-bar and separator-bar are carried, and consequently the swinging movements of the said arms do not affect the connection between the said bars and the sleeve and slide-bar.

Figures 6, 7, 8, 9, 10, 11, 12, 13, 14, 27, 28, 29:
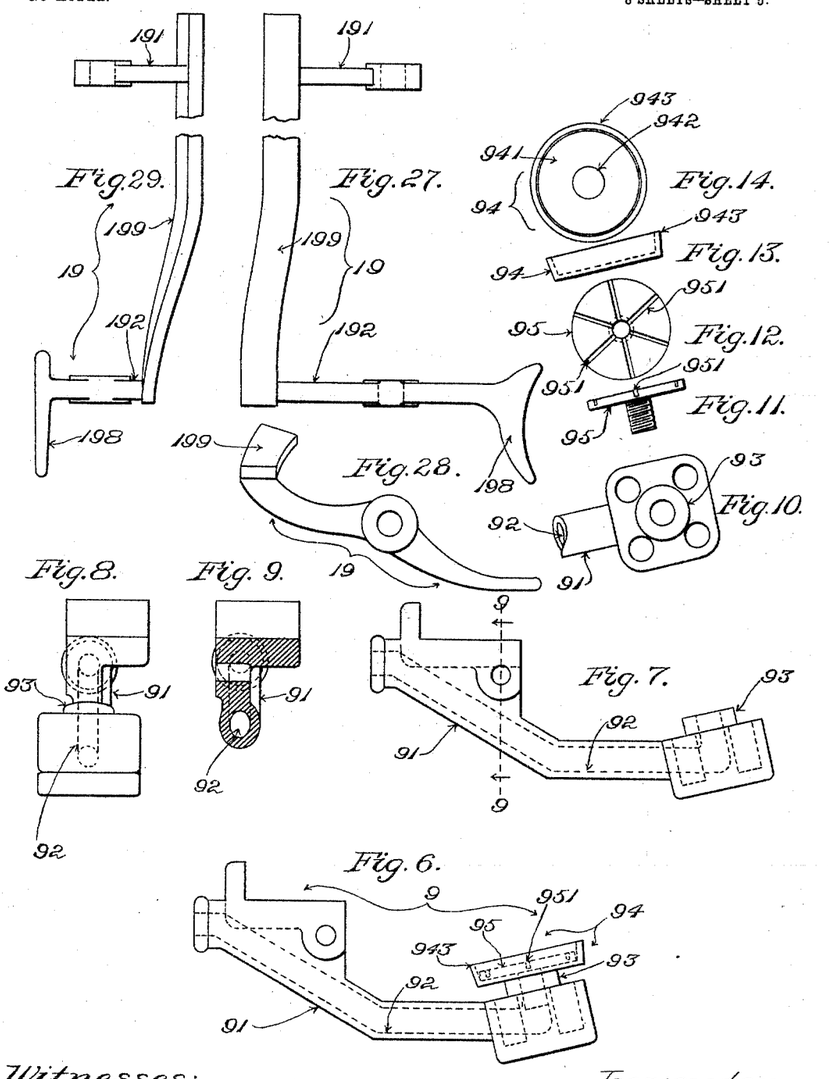
Figure 30:
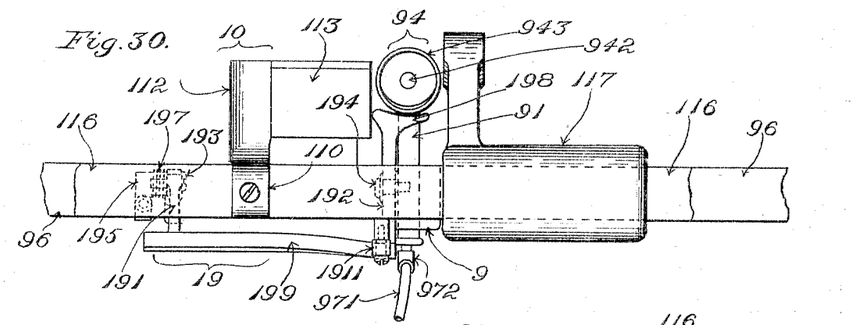
Fig. 30, Sheet 8, is a view illustrating in plan portions of the picker-bar, the separator-bar, a picker, a separator, and a detacher, illustrating the relations of these parts.
Figure 31:
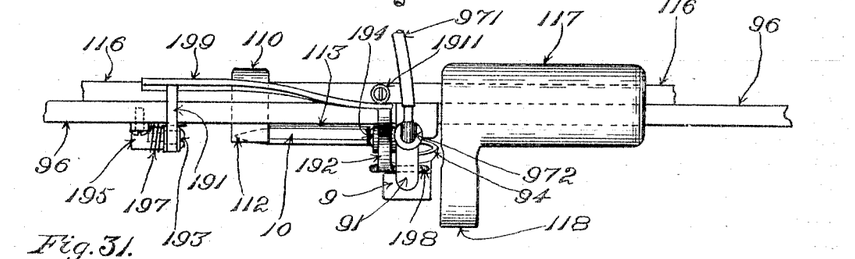
Fig. 31, Sheet 8, shows the devices of Fig. 30 in front elevation.
Figures 32, 33:
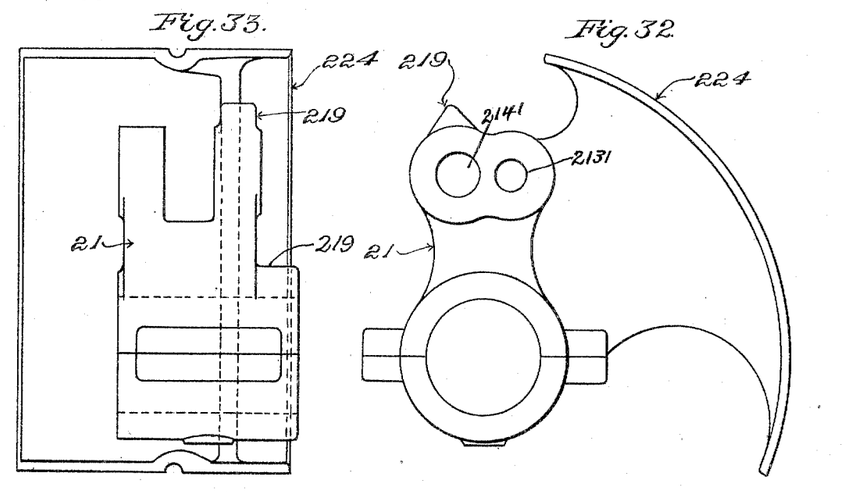
Fig. 32, Sheet 7, shows in side elevation the carrier of one of the transferring-heads.
Fig. 33, Sheet 7, shows the said carrier in front elevation.
Figure 34:
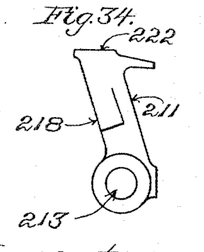
Figs. 34 and 35, Sheet 7, are views in side and front elevation, respectively, of the under jaw of one of the transferring-heads.
Figures 35, 36:
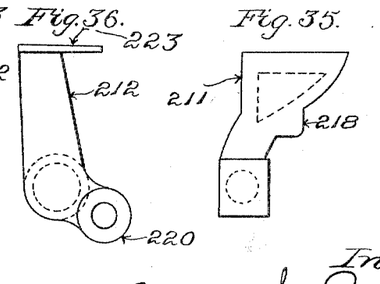
Figs. 36 and 37, Sheet 7, are similar views of the upper jaw of one of the transferring-heads.
Figure 37:
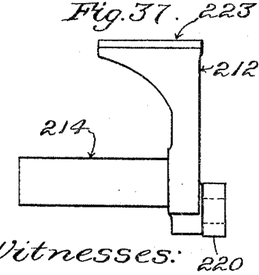

For the purpose of breaking the hold of the picker upon the signature which has been engaged thereby I provide in connection with each picker the devices which are shown in detail in Figs. 27, 28, and 29 of Sheet 5 and Figs. 30 and 31 of Sheet 8. Figs. 27, 28, and 29 show separately the suction-breaker or detacher 19. This device consists of a small rocker having opposite arms 191 192. The said arms are pivotally connected, as at 193 194, respectively, Figs. 30 and 31, with the bracket 195, carried by the picker-bar 96, and with the body portion or arm 91 of the picker, in connection with which the detacher or suction-breaker is employed. A torsion-spring 197, in connection with the said bracket 195, acts upon the detacher or suction-breaker with a tendency to hold the same in a position in which its signature-engaging portion 198 is depressed relative to the cup of the picker. The detacher or suction-breaker is formed or provided with a cam-shaped rail 199, upon which acts a roll 1911, carried by the separator-bar 116. When the said separator-bar is moved endwise for the purpose of inserting the separator, which is carried thereby, between the signature which has been engaged and depressed by the picker and the next succeeding signature, the said roll runs along the cam-shaped surface of the said rail and acts to turn the detacher or suction-breaker on its pivots so as to detach the signature from the picker.

Figure 38:
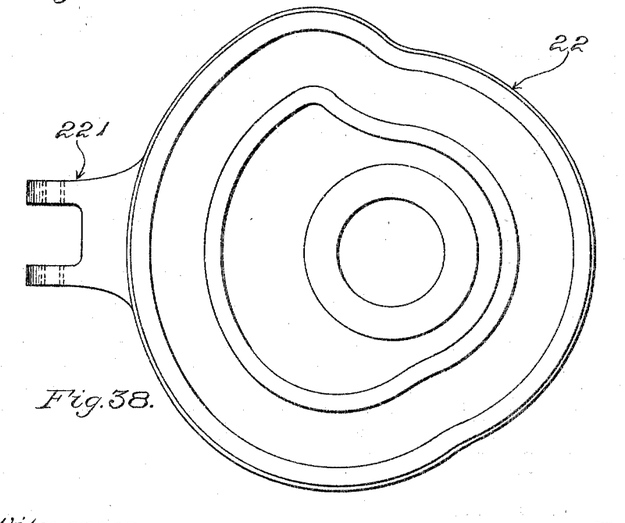
Figs. 38 and 39, Sheet 8, are side and edge views, respectively, of the gripper-actuating cam of one of the transferring-heads.
Figure 39:
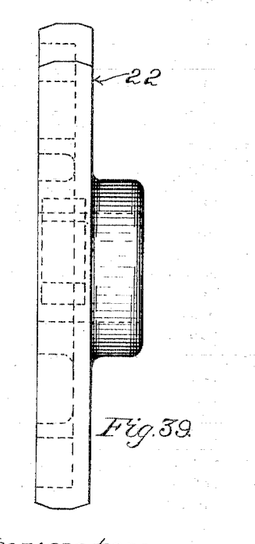

Upon the main shaft 100 of the machine adjacent each hopper or receptacle for signatures is mounted a transferring-head, of which the grippers hereinbefore mentioned constitute the chief essential working element. (See Figs. 4 and 5, Sheet 4; Figs. 32 to 37, Sheet 7, and Figs. 38 and 39, Sheet 8.) The grippers are carried by an arm or carrier 21, which is made fast upon shaft 100. The said carrier is shown separately in Figs. 32 and 33. The gripper-jaws are marked, respectively, 211 and 212, the jaw 211 (shown separately in Figs. 34 and 35) being what is referred to hereinafter as the "under" jaw and the jaw 212 (shown separately in Figs. 36 and 37) being what is referred to hereinafter as the "upper" jaw. The jaws 211 and 212, respectively, are mounted upon the pivots 213 and 214, these pivots being located eccentrically with relation to each other—that is to say, at a short distance apart in the direction in which the transferring-head rotates. The pivots at 213 214 are constituted by studs which are connected with the respective jaws and fitted to bearings at 2131 2141, respectively, Fig. 32, Sheet 7, in the carrier-arm 21, the said studs being free to turn in the said bearings. The stud 213 of the under jaw 211 projects beyond its bearings and has applied thereto a spiral spring 215, Fig. 5, Sheet 4, one end of which is engaged with a fixed portion of the carrier-arm 21, while the other end thereof is engaged with a collar 216, which is made fast upon the stud 213 by means of a clamping-screw 217. By the action of the said spring 215 the under jaw 211 is held pressed forward in its normal position, the said position being determined by the engagement of a projection or lug 218 upon the said jaw with the projection or lug 219, which is formed or provided upon the carrier-arm 21. The upper jaw 212 is furnished with a pin or roll, as at 220, working in the groove of a cam 22, which is shown separately in Figs. 38 and 39, Sheet 8. The said cam 22, termed by me the "gripper-operating" cam, is mounted in a fixed position surrounding the shaft 100, it being furnished with a suitable projection 221 for attachment to a fixed portion of the machine-framing. The surface 222 at the outer end of the under jaw 211 is the portion of said jaw which coöperates with the upper jaw 212 in clamping a signature. To the outer end of the upper jaw 212 is attached a plate 223, it projecting at the side of the said upper jaw toward the under jaw and being adapted to pass over the end of the said under jaw as the upper jaw is moved backward and forward, the under surface of the said plate 223 coacting with the end surface 222 of the under jaw in clamping the signature. Adjacent the pivotal mounting for the jaws the carrier 21 is furnished with a concentric support 224 for the support of the signature which has been drawn out from the adjacent stack or pile by the action of the grippers and during the transfer of said signature to the collecting mechanism.

Having reference more particularly to Figs. 1, 2, and 3 of the drawings, I have shown the chains 13 13 of the collecting mechanism as supported at the opposite ends of the machine by means of sprocket-wheels 1319 1319, around which such chains pass, the said sprocket-wheels being mounted upon shafts 132 132, which are supported in suitable bearings on the machine-framing. Sprocket-wheels are provided at intervals for the support of the slack of the lower portion of the said chains, as at 133 133, Figs. 1 and 3. The chains are driven by means of a sprocket-chain 134, Fig. 1, passing around sprocket-wheels on one of the shafts 132 and on a second shaft 135 above the former, the said shaft 135 having a bevel-gear 136 engaged with a bevel-gear 137 on the main shaft 100.

The operation in general will be clearly understood from the foregoing description. I may add that the signatures in each stack or pile lie with one end of each thereof toward the front of the machine and the folded back of each at one side of the hopper or receptacle—that is to say, each signature lies with its head end to the front and its folded back to one side. The picker 9 normally occupies a position at one side of the stack or pile with which it coöperates. In the present drawings this position is at the right-hand side of the stack. (See Figs. 3 and 5.) In this position the picker is depressed below the level of the upper surface of the table 2, upon which the signatures rest. (See Fig. 4.) In its action it first is shifted laterally (toward the left in the drawings) from the position of Figs. 3 and 5 into a position beneath the adjacent forward corner of the signature with which it is to engage. (See Figs. 1 and 2.) It then is raised into engagement with the said corner, then the air is exhausted from the same to cause the signature to adhere thereto, and then the cup is depressed. At this stage the separator, which previously has occupied a position at the right of the stack or pile with which it coöperates, as shown in Figs. 1 and 2, is moved laterally (toward the left in the drawings) to the position shown in Figs. 3 and 5, and thereby caused to enter between the depressed corner of the bottom signature and the signature which is next above in the stack or pile. Then the vacuum is relieved, and the picker having become disengaged from the signature is returned laterally toward the right in the drawings into its original position (shown in Figs. 3 and 5) out of the path of rotation of the transferring-grippers. The separator now is caused to rise, thereby lifting the stack or pile above the same, so as to take the weight of the stack or pile off the bottom signature. The separator remains in its lifted position while the gripper-jaws engage with the bottom signature and pull it out from beneath the stack or pile and also while the picker returns into position beneath the stack or pile again. The separator then is withdrawn edgewise laterally from under the stack or pile by movement toward the right, restoring it to the position in Figs. 1 and 2. In being depressed by the picker the head end of the bottom signature is bent downward over the free edge of the shelf 2, upon which it rests. The carrying-arms 118 118 are pivoted at the said front edge of the shelf 2 in order that the pickers and separators may swing in arcs concentric with that in which the portion of the signature with which they engage is bent. The maximum of clearance thereby is secured in consequence of keeping the surface of the separator approximately parallel against the surface of the signature against which it acts. As the transferring-head rotates and as the grippers thereon come around into postion adjacent the head end of the bottom signature the upper jaw is moved forwardly by the action of its cam 22, so that in its advance with the transferring-head it shall not strike against the depressed portion of the said bottom signature. The lower jaw remains in its normal position on said transferrer-head, which is determined by the engagement of the stop lugs or projections 218 219 with each other. As soon as the upper jaw passes the head end of the bottom signature it is caused by its cam 22 to begin to move rearwardly, its rearward movement being caused to proceed at such relative speed as to cause its plate 223 to overlap the said head end. In its rearward movement the upper jaw by contact with the under jaw transmits corresponding movement to the latter, both continuing to move rearwardly in unison at approximately the same rate of speed as the transferring-head is moving forward. This retains the jaws in a relatively stationary position with respect to the edge of the signature. Meanwhile in consequence of the fact that the jaws are pivoted upon different centers they are closing upon each other, so as to grip the head end of the bottom signature between them. As soon as they have grasped the signature fully the jaws move onward with the transferring-head, withdrawing the bottom signature from the stack or pile, the rear portion of the said signature then finding a support on the segment 224 at the rear of the jaws. The signature is then delivered to the collecting mechanism by the opening of the jaws, which permits the said signature to fall upon the support 12 and conveying-chains 13 13. The recess below the plate 113 of the separator 10 alongside the portion 111 of the separator affords clearance to the upper jaw of the transferring-grippers as such jaw is moved into position for engagement with the head portion of the bottom signature.

For the purpose of enabling all of the pressers 6 of the series of hoppers or receptacles for signatures to be raised simultaneously when desired the swinging supporting-arm 7 of each of the said pressers is furnished with a lateral shoulder 72, as indicated best in the detail views Figs. 40 and 42, Sheet 1 of the drawings, and upon the rod 8 adjacent each arm 7 is fixed a collar 71, having a corresponding shoulder 73, Fig. 43, Sheet 1, to take against the said shoulder 72 of the arm 7. Ordinarily sufficient play exists between the shoulders 72 73 of an arm 7 and the corresponding collar 71 to permit the presser that is mounted on the said arm to accommodate itself to the height of the stack or pile of signatures which is contained within the hopper or receptacle to which such presser pertains. The shaft 8 is furnished at the end thereof with an arm or handle 81, Figs. 1, 2, and 3. When the rod 8 is turned by means of this arm or handle, engagement of the respective collars 71 with those of the shoulders of the respective arms 7 will raise the series of pressers.

I do not herein lay claim, broadly, to the combination, with means for holding a stack of signatures or the like to be fed and transferring devices to engage with the elements of the said stack successively and withdraw such elements from the stack, of a picker, a separator, and actuating connections for said picker and separator, whereby the picker is caused to engage the leading element of the stack and whereby the separator is caused to enter between said element and the remainder of the stack and then is moved to relieve the pressure of the said remainder from the said leading element to facilitate the withdrawal of the latter. I have claimed such combination in a divisional application.

What I claim is—

1. In combination, means for supporting a series of stacks of signatures or the like, a series of suction-pickers, means to operate said pickers to engage with the leading elements in the respective stacks and separate a portion of each of such elements from the remainder of the corresponding stack, means to move back the remainders of the respective stacks to relieve the pressure of the said remainders against the said leading elements at the time of the withdrawal of such elements, and thereby facilitate such withdrawal, transferring means to engage with the portions of the said elements which have been separated by the pickers as aforesaid and withdraw such elements from the stacks, and collecting means for the withdrawn elements, substantially as described.

2. In combination, means for supporting a series of stacks of signatures or the like, a series of suction-pickers, means to operate said pickers to engage with the leading elements in the respective stacks and separate a portion of each of such elements from the remainder of the corresponding stack, means to move back the remainders of the respective stacks to relieve the pressure of the said remainders against the said leading elements at the time of the withdrawal of such elements, and thereby facilitate such withdrawal, grippers to engage with the portions of the said elements which have been separated by the pickers aforesaid, means to operate said grippers to cause them to withdraw such elements from the stack, and collecting means for the elements which are delivered by the said grippers, substantially as described.

3. In combination, means for supporting a series of stacks of signatures or the like, a series of moving pickers, means to operate said pickers to engage with the leading elements in the respective stacks and separate a portion of each of such elements from the remainder of the corresponding stack, means to move back the remainders of the respective stacks to relieve the pressure of the said remainders against the said leading elements at the time of the withdrawal of such elements, and thereby facilitate such withdrawal, a series of rotating grippers to engage with the portions of the said elements which have been separated by the pickers as aforesaid and withdraw such elements from the stacks, and collecting means for the withdrawn elements, substantially as described.

4. In combination, means for holding a series of stacks of signatures or the like, a series of moving pickers, means to operate said pickers to separate a portion of an element of each of the said stacks from the remainder of the corresponding stack, means to shift the remainders of the respective stacks to relieve the pressure of the said remainders against the said leading elements at the time of the withdrawal of such elements, and thereby facilitate such withdrawal, transferring devices to engage with the portions of the said elements which have been separated by the pickers as aforesaid and withdraw such elements from the stacks, means for moving said transferring devices in a circular path, and collecting means for the withdrawn elements, substantially as described.

5. The combination with means for holding a series of stacks of signatures or the like, transferring devices to engage with the elements of the said stacks successively and withdraw such elements from the stacks, and collecting means for the withdrawn elements, of a series of pickers, a series of separators, and actuating connections for said pickers and separators whereby the pickers are caused to engage the leading element of each stack, and whereby the separators are caused to enter between said elements and the remainders of the stacks and are then moved toward the main portions of the stacks to remove the pressure thereof from the said leading elements, to facilitate the withdrawal, substantially as described.

6. The combination with means for holding a series of stacks of signatures or the like, a series of rotating grippers to engage with the elements of said stacks successively and withdraw the same from the stacks, and collecting means for the withdrawn elements from the said grippers, of a series of pickers, a series of separators, and actuating connections for said pickers and separators whereby the pickers are caused to engage the leading element of each stack, and whereby the separators are caused to enter between said elements and the remainders of the stacks and are then moved toward the main portions of the stacks to remove the pressure thereof from the said leading elements, to facilitate the withdrawal, substantially as described.

7. The combination with means for holding a series of stacks of signatures or the like, a series of pickers, a bar carrying said series of pickers, a series of separators, a bar carrying said series of separators, actuating connections whereby the said bars are moved endwise and also are moved transversely of their length in a direction toward and from the stacks, transferring means to engage the elements of said stacks after being partially separated by the action of the said pickers and separators and withdraw such elements from the stacks, and collecting means for the withdrawn elements, substantially as described.

8. In combination, means for holding a series of stacks of signatures or the like, a series of pickers, a common carrier for said series of pickers, a series of separators, a common carrier for said series of separators, actuating connections whereby the said carriers are moved lengthwise of the said series of stacks and also are operated to move the pickers and separators in a direction toward and from the stacks, a series of transfer devices, a shaft on which said transfer devices are mounted, means to operate the said transfer devices, and collecting means for the elements which are withdrawn from said stacks by the said transfer devices, substantially as described.

9. The combination with means for holding a series of stacks of signatures or the like, a series of rotary transfer-grippers to engage with the elements of said stacks successively and withdraw the same from the stacks, and collecting means for the withdrawn elements, of a series of pickers to engage the leading elements of the respective stacks, a common carrier for the said pickers, a series of separators, a common carrier for said separators, and actuating connections for the said carriers, whereby the latter are moved lengthwise of the series of stacks and also are operated to move the pickers and separators in a direction toward and from the stacks, substantially as described.

10. The combination with means for supporting a series of stacks of signatures or the like, a series of transferring devices adjacent the respective stacks, and collecting mechanism, of a series of pickers, a series of separators, bars respectively carrying the said pickers and separators, movable supports for the said bars, means for communicating endwise movements to the said bars relative to the said supports, and means for moving said supports in a direction toward and from the stacks, substantially as described.

11. The combination with means for supporting a series of stacks of signatures or the like, a series of transfer devices and collecting mechanism, of pickers having their inoperative or retracted positions at one side of the paths of the respective transfer devices, separators having similar inoperative or retracted positions, and operating connections for said pickers and separators, said connections acting to move the latter transversely of the said paths in bringing them into action, substantially as described.

12. The combination with means for supporting a series of stacks of signatures or the like, of a series of pickers to engage with the leading element of each stack, a series of separators to enter between the said leading element after being engaged by the pickers and the remainders of the respective stacks, a series of transfer devices to withdraw the said leading elements from the stacks, collecting mechanism for the elements delivered by the said transfer devices, and operating connections for said pickers and separators whereby the said pickers are caused to engage with the leading element of each stack, and whereby, also, the said separators are caused to move endwise of the series in entering between the leading elements of the respective stacks and the main portions of the latter, substantially as described.

13. The combination with means for supporting a series of stacks of signatures or the like, a series of transfer devices, and collecting mechanism, of a series of pickers having their inoperative or retracted positions at one side of the paths of the respective transfer devices, a series of separators, and actuating connections for said pickers and separators, said connections acting to move the pickers transversely with relation to the said paths from the said inoperative or retracted positions into positions in line with the transfer devices in carrying said pickers into action, substantially as described.

14. The combination with means for supporting a series of stacks of signatures or the like, a series of pickers, a common carrier for the said pickers, a series of separators, a common carrier for said separators, a rotary shaft having connected therewith a series of transfer devices, operative connections between the said shaft and said carriers for actuating the latter and a collecting mechanism, substantially as described.

15. The combination with means for supporting a series of stacks of signatures or the like, a series of pickers, a common carrier for the said pickers, a series of separators, a common carrier for the said separators, a rotary shaft carrying a series of transfer devices, operative connections between said shaft and said carriers for communicating to the latter endwise movements and also movements to move the pickers and separators in a direction toward and from the said stacks, and collecting mechanism, substantially as described.

16. The combination with means for supporting a series of stacks of signatures or the like, a series of pickers, a common carrier for the said pickers, a series of separators, a common carrier for the said separators, a rotary shaft carrying a series of transfer devices, cams connected with said shaft and in operative connection with said carriers to communicate endwise movements thereto, and cams connected with said shaft and in operative connection with said carriers to communicate movements thereto to move the pickers and separators in a direction toward and from the said stacks, and collecting mechanism, substantially as described.

17. In combination, supports for a series of stacks of signatures or the like, a series of suction-pickers, a series of separators, a series of movable detachers to loosen the hold of the pickers upon the signatures engaged thereby, means to operate the said detachers, transferring means for the said signatures, and collecting means for the signatures which are delivered by said transferring means, substantially as described.

18. In combination, supports for a series of stacks of signatures or the like, a series of suction-pickers, a carrier for said pickers, a series of separators, a carrier for said separators, means for operating the said carriers, a series of movable detachers to loosen the hold of the pickers upon the signatures engaged thereby, means for operating said detachers from the carrier for the separators, transferring means for the said signatures, and collecting means for the signatures delivered by said transferring means, substantially as described.

19. In combination, a support for a stack of signatures or the like, means for moving the leading element of such stack into position to be grasped, a rotating carrier, two jaws upon said carrier, and means whereby in the forward rotation of the carrier the jaws are moved rearwardly to inclose the forward edge of said element and also moved relatively to each other to close upon said edge, the continued movement of the carrier effecting the withdrawal of the element from the stack, substantially as described.

20. In combination, a support for a stack of signatures or the like, means for moving the leading element of such stack into position to be grasped, a rotating carrier, a movable spring-actuated gripper-jaw mounted on said carrier, an opposing jaw also mounted on said carrier, and a cam whereby in the continued forward rotation of the carrier the latter jaw is actuated to communicate a rearward movement to both jaws, close them upon an edge of said element and withdraw the latter from the stack, substantially as described.

21. In combination, a support for a stack of signatures or the like, means for moving the leading element of such stack into position to be grasped, a rotating carrier, two jaws upon said carrier mounted upon pivots which are eccentric with relation to each other, and means whereby in the rotation of the carrier the jaws are moved rearwardly to pass over the forward edge of the said element, and also moved relatively to each other to close upon said edge, the continued movement of the carrier effecting the withdrawal of the element from the stack, substantially as described.

22. In a machine for gathering signatures and the like, in combination, means for supporting a series of stacks of signatures or the like, a series of pickers, a carrier for said pickers, a series of separators, a carrier for said separators, a shaft extending lengthwise of the said series of parts, cams thereon in operative connection with said carriers and actuating the latter, transferring-grippers carried by said shaft and operated by the rotation thereof, and collecting means for the signatures delivered by the said grippers, substantially as described.

23. In combination, a series of hoppers or receptacles, pressers in the respective hoppers or receptacles, arms on which said pressers are mounted, a longitudinal rod on which said arms are free to swing, projections on said rod to engage with the said arms, and means to turn the said rod to cause all the pressers to be uplifted.

In testimony whereof I affix my signature in presence of two witnesses.

STUART H. PRAY.

Witnesses:
   CHAS. F. RANDALL,
   WILLIAM A. COPELAND.